United States Patent
Cheng

(10) Patent No.: US 12,483,751 B2
(45) Date of Patent: Nov. 25, 2025

(54) DISPLAY CONTROL METHOD AND DISPLAY CONTROL APPARATUS, VIDEO PROCESSING APPARATUS, AND DISPLAY SYSTEM

(71) Applicant: BOE TECHNOLOGY GROUP CO., LTD., Beijing (CN)

(72) Inventor: Xinyi Cheng, Beijing (CN)

(73) Assignee: BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 18/261,746

(22) PCT Filed: Aug. 24, 2022

(86) PCT No.: PCT/CN2022/114368
§ 371 (c)(1),
(2) Date: Jul. 17, 2023

(87) PCT Pub. No.: WO2023/030104
PCT Pub. Date: Mar. 9, 2023

(65) Prior Publication Data
US 2024/0107112 A1    Mar. 28, 2024

(30) Foreign Application Priority Data
Aug. 31, 2021    (CN) .......................... 202111012189.2

(51) Int. Cl.
*H04N 21/232*    (2011.01)
*H04N 21/236*    (2011.01)
(Continued)

(52) U.S. Cl.
CPC ... *H04N 21/4385* (2013.01); *H04N 21/23608* (2013.01); *H04N 21/4312* (2013.01)

(58) Field of Classification Search
None
See application file for complete search history.

(56) References Cited

U.S. PATENT DOCUMENTS

2011/0069940 A1* 3/2011 Shimy .............. H04N 21/42201
386/296
2011/0122147 A1 5/2011 Yasukawa et al.
(Continued)

FOREIGN PATENT DOCUMENTS

CN    2175502 Y    8/1994
CN    1878260 A    12/2006
(Continued)

OTHER PUBLICATIONS

Chinese First Office Action dated Sep. 29, 2022 relating to CN Patent Application No. 202111012189.2.

*Primary Examiner* — Brian T Pendleton
*Assistant Examiner* — Jean D Saint Cyr
(74) *Attorney, Agent, or Firm* — DINSMORE & SHOHL LLP

(57) ABSTRACT

The present disclosure provides a display control method and a display control apparatus, a video processing apparatus and a display system. The display control method includes the following steps: determining whether a received switching instruction is a multi-image display instruction; extracting a plurality of video identifiers from the multi-image display instruction in a case where the switching instruction is the multi-image display instruction; multiplexing input videos of a plurality of channels corresponding to the plurality of the video identifiers to generate a first video; and sending the first video to a display apparatus for multi-image display.

6 Claims, 8 Drawing Sheets

(51) Int. Cl.
  *H04N 21/2368*  (2011.01)
  *H04N 21/43*  (2011.01)
  *H04N 21/431*  (2011.01)
  *H04N 21/4385*  (2011.01)

(56) References Cited

U.S. PATENT DOCUMENTS

| | | | |
|---|---|---|---|
| 2011/0187925 A1* | 8/2011 | Onoda | H04N 21/4884 |
| | | | 348/468 |
| 2013/0342634 A1 | 12/2013 | Zhang | |
| 2015/0304609 A1 | 10/2015 | Ma et al. | |
| 2017/0223405 A1* | 8/2017 | Hsiao | H04N 21/4316 |

FOREIGN PATENT DOCUMENTS

| | | | |
|---|---|---|---|
| CN | 101031065 A | 9/2007 | |
| CN | 101257607 A | 9/2008 | |
| CN | 101291398 A | 10/2008 | |
| CN | 102075718 A | 5/2011 | |
| CN | 102215375 A | 10/2011 | |
| CN | 102263930 A | 11/2011 | |
| CN | 102833518 A | 12/2012 | |
| CN | 103051865 A | 4/2013 | |
| CN | 107333165 A | 11/2017 | |
| CN | 207399375 U | 5/2018 | |
| CN | 209784864 U | 12/2019 | |
| CN | 111324322 A | 6/2020 | |
| CN | 111913614 A | 11/2020 | |
| CN | 113727149 A | 11/2021 | |
| JP | 2006081106 A | 3/2006 | |

* cited by examiner

DISPLAY CONTROL METHOD AND DISPLAY CONTROL APPARATUS, VIDEO PROCESSING APPARATUS, AND DISPLAY SYSTEM

CROSS-REFERENCE TO RELATED APPLICATIONS

The present application is a U.S. National Stage Application under 35 U.S.C. § 371 of International Patent Application No. PCT/CN2022/114368, filed on Aug. 24, 2022, which is based on and claims priority from CN application No. 202111012189.2 filed on Aug. 31, 2021, the disclosure of both of which are hereby incorporated into this disclosure by reference in its entirety.

TECHNICAL FIELD

The present disclosure relates to the field of display technologies, and in particular, to a display control method and a display control apparatus, a video processing apparatus, and a display system.

BACKGROUND

In the related art, a video multiplexer is used to multiplex a plurality of videos to generate an output video, and the output video is displayed by a display apparatus. Since the output video includes a plurality of images of the plurality of the videos, multi-image display is performed on the display apparatus.

SUMMARY

According to a first aspect of the embodiments of the present disclosure, there is provided a display control method, performed by a display control apparatus, comprising: determining whether a received switching instruction is a multi-image display instruction; extracting a plurality of video identifiers from the multi-image display instruction in a case where the switching instruction is the multi-image display instruction; multiplexing input videos of a plurality of channels corresponding to the plurality of the video identifiers to generate a first video; and sending the first video to a display apparatus for multi-image display.

In some embodiments, an area of a image of an input video with high resolution is greater than an area of a image of an input video with low resolution in the first video.

In some embodiments, the method further comprising: determining whether a full-screen display instruction comprises a video identifier in a case where the switching instruction is the full-screen display instruction; and sending an input video corresponding to the video identifier in the full-screen display instruction to the display apparatus for full-screen display in a case where the full-screen display instruction comprises the video identifier.

In some embodiments, the method further comprising: detecting whether a current display mode is a full-screen display mode in a case where the full-screen display instruction does not comprise the video identifier; sending a next input video of an input video currently displayed in the full screen to the display apparatus for full-screen display according to a preset sequence in a case where the current display mode is the full-screen display mode.

In some embodiments, the method further comprising: sending a preset input video to the display apparatus for full-screen display in a case where the current display mode is a multi-image display mode.

In some embodiments, the method further comprising: multiplexing all input videos to generate a second video in a case where the switching instruction is a preview instruction, wherein resolution of the second video is smaller than resolution of the first video; and sending the second video to the display apparatus for previewing.

In some embodiments, the method further comprising: sending a video currently sent to the display apparatus to a user terminal in a wireless manner for display after receiving a projection instruction sent by the user terminal.

In some embodiments, the method further comprising: extracting sliding start position information and sliding end position information from a sliding operation instruction after receiving the sliding operation instruction sent by the user terminal; determining a first input video corresponding to the sliding start position information and a second input video corresponding to the sliding end position information in the video currently sent to the display apparatus; and interchanging a position of an image of the first input video and a position of an image of the second input video.

In some embodiments, the method further comprising: reading a pre-stored configuration file in a case where the display control apparatus is started, wherein the pre-stored configuration file corresponds to a display mode of the display control apparatus before a latest shutdown; detecting whether a current video input status is consistent with a video input status before the latest shutdown; and selecting a display mode corresponding to the pre-stored configuration file in a case where the current video input status is consistent with the video input status before the latest shutdown.

In some embodiments, the method further comprising: determining whether there is currently an input video of only one channel in a case where the current video input status is inconsistent with the video input status before the latest shutdown; and sending the input video of the only one channel to a display apparatus for full-screen display in a case where there is currently the input video of the only one channel.

In some embodiments, the method further comprising: determining whether a display mode before the latest shutdown is a full-screen display mode in a case where there are currently input videos of a plurality of channels; determining whether there is currently a newly accessed input video in a case where the display mode before the latest shutdown is the full-screen display mode; sending a newly accessed input video of one channel to a display apparatus for full-screen display in a case where there is currently the newly accessed input video of the one channel.

In some embodiments, the method further comprising: selecting an input video from newly accessed input videos of a plurality of channels according to a preset sequence in a case where there are currently the newly accessed input videos of the plurality of the channels and sending selected input video to the display apparatus for full-screen display.

In some embodiments, the method further comprising: detecting whether there is an input video quitting access in a case where there is no newly accessed input video, wherein the input video quitting access is an input video that was accessed before the latest shutdown; and sending a next input video of the input video quitting access to a display apparatus for full-screen display according to a preset sequence in a case where there is the input video quitting access.

In some embodiments, the method further comprising: multiplexing the currently accessed input videos to generate a third video in a case where the display mode before the latest shutdown is a multi-screen display mode; and sending the third video to a display apparatus for multi-screen display.

In some embodiments, resolution of the third video is greater than a preset threshold.

In some embodiments, the method further comprising: multiplexing the current accessed videos to generate a fourth video in a case where the display mode before the latest shutdown is a preview mode, wherein resolution of the fourth video is smaller than a preset threshold; and sending the fourth video to a display apparatus for previewing.

According to a second aspect of the embodiments of the present disclosure, there is provided a display control apparatus comprising: a processor; and a memory coupled to the processor, storing program instructions which, when executed by the processor, cause the processor to implement a display control method according to any one of the embodiments described above.

According to a third aspect of the embodiments of the present disclosure, there is provided a video processing apparatus comprising: the display control apparatus according to any one of the embodiments described above, a plurality of video input ports configured to send the accessed input videos to the display control apparatus; and a first interface configured to send the video sent by the display control apparatus to a display apparatus for display.

In some embodiments, the video processing apparatus further comprises: a second interface configured to wirelessly send the video sent by the display control apparatus to a user terminal for displaying.

According to a fourth aspect of embodiments of the present disclosure, there is provided a display system comprising: the video processing apparatus according to any one of the embodiments described above; and a display apparatus configured to display a video sent by the video processing apparatus.

In some embodiments, the display system further comprises: a user terminal configured to send a projection instruction to the video processing apparatus, receive and display a video wirelessly sent by the video processing apparatus.

In some embodiments, the user terminal is further configured to send a sliding operation instruction to the video processing apparatus in a case where a user performs a sliding operation on a video displayed by the user terminal, wherein the sliding operation instruction comprises sliding start position information and sliding end position information.

According to a fifth aspect of the embodiments of the present disclosure, a non-transitory computer-readable storage medium is provided. The computer-readable storage medium stores computer instructions which, when executed by a processor, implement the method according to any one of the embodiments described above.

Other features of the present disclosure and advantages thereof will become apparent from the following detailed description of exemplary embodiments thereof, which proceeds with reference to the accompanying drawings.

BRIEF DESCRIPTION OF THE DRAWINGS

The accompanying drawings, which are incorporated in and constitute a part of this specification, illustrate embodiments of the disclosure and together with the description, serve to explain the principles of the disclosure.

The present disclosure may be more clearly understood from the following detailed description taken in conjunction with the accompanying drawings, in which.

It should be understood that the dimensions of the various parts shown in the drawings are not drawn to scale. Further, the same or similar reference numerals denote the same or similar components.

DETAILED DESCRIPTION

Figure 1:
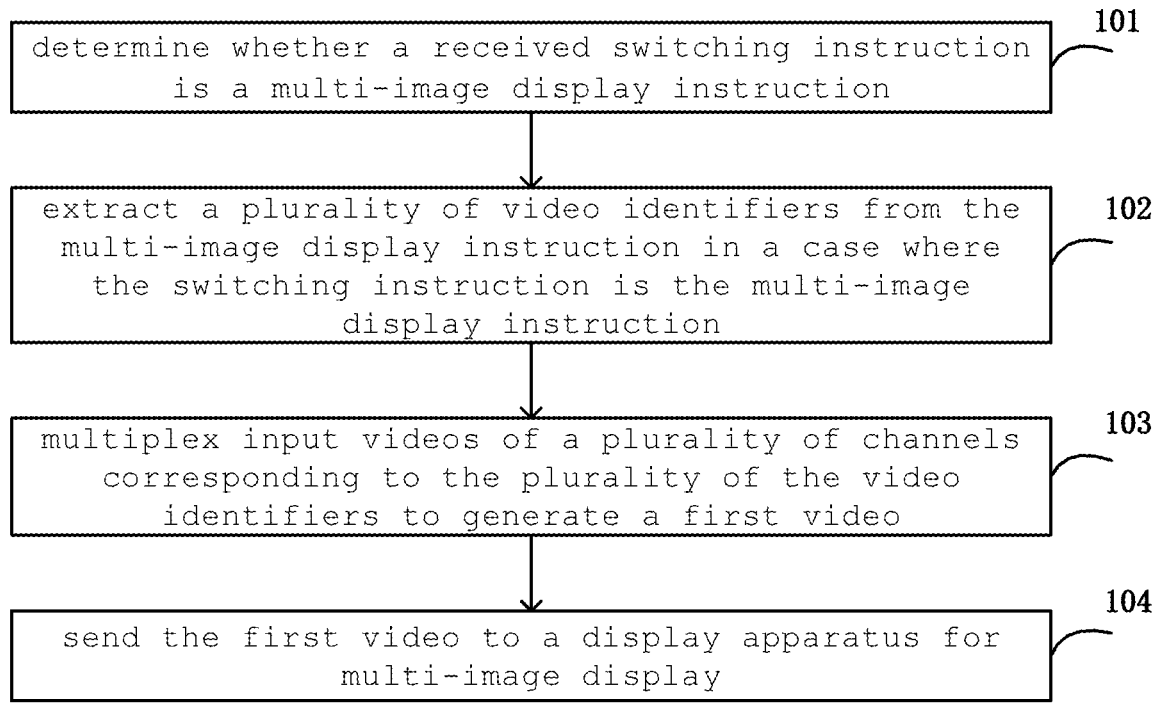
FIG. 1 is a flow diagram of a display control method according to one embodiment of the present disclosure.

Various exemplary embodiments of the present disclosure will now be described in detail with reference to the accompanying drawings. The description of the exemplary embodiments is merely illustrative and is in no way intended to limit the disclosure, its application, or uses. The present disclosure may be embodied in many different forms and is not limited to the embodiments described herein. These embodiments are provided so that this disclosure will be thorough and complete, and will fully convey the scope of the disclosure to those skilled in the art. It should be noted that the relative arrangement of parts and steps, the composition of materials and values set forth in these embodiments are to be construed as illustrative only and not as limiting unless otherwise specifically stated.

The use of "first", "second", and similar words in this disclosure is not intended to indicate any order, quantity, or importance, but rather is used to distinguish one element from another. The word "comprise" or "include", and the like, means that the element preceding the word comprises the element listed after the word, and does not exclude the possibility that other elements may also be included.

All terms (including technical or scientific terms) used herein have the same meaning as commonly understood by one of ordinary skill in the art to which this disclosure belongs unless specifically defined otherwise. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Techniques, methods, and device known to one of ordinary skill in the relevant art may not be discussed in detail but are intended to be part of the specification where appropriate.

The inventor finds that the video multiplexer cannot perform multi-image display switching according to the user selection. For example, if a user wants to watch the image of an input video of the 1st channel to the image of an input video of the $4^{th}$ channel, it is necessary to access the input video of the 1st channel to the input video of the $4^{th}$ channel to a video multiplexer, and the video multiplexer multiplexes the input video of the 1st channel to the input video of the $4^{th}$ channel to generate an output video with 4 images. If the user wants to watch the image of the input video of the 1st channel and the image of the input video of the 2nd channel, the user needs to stop the input video of the $3^{rd}$ channel and the input video of the $4^{th}$ channel from being accessed to the video multiplexer in a manual mode. Since the operation is complex, the user experience is reduced.

Accordingly, the present disclosure provides a display control scheme, which can select a corresponding input video for multiplexing processing according to a user's requirement, to implement multi-image display switching conveniently and rapidly.

FIG. 1 is a flow diagram illustrating a display control method according to one embodiment of the present disclosure. In some embodiments, the display control method is performed by a display control apparatus.

In step 101, it is determined whether a received switching instruction is a multi-image display instruction.

In some embodiments, the user sends a switching instruction by means of infrared remote control, bluetooth remote control or the like.

In step 102, a plurality of video identifiers is extracted from the multi-image display instruction in a case where the switching instruction is the multi-image display instruction.

In step 103, input videos of a plurality of channels corresponding to the plurality of the video identifiers are multiplexed to generate a first video.

In some embodiments, resolution of the first video is greater than a predetermined threshold, to ensure the viewing effect of the user.

In step 104, the first video is sent to a display apparatus for multi-image display.

For example, the input video of the 1st channel to the input video of the $8^{th}$ channel have been accessed to the display control apparatus. The user desires to simultaneously display the images of the input video of the 1st channel and the input video of the 2nd channel on the display apparatus, a multi-image display instruction including the video identifiers ID1 of the input video of the 1st channel and ID2 of the input video of the 2nd channel is sent to the display control apparatus. The display control apparatus multiplexes the input video of the 1st channel and the input video of the 2nd channel according to the multi-image display instruction to generate an output video, and sends the output video to the display apparatus to perform multi-image display. The display result is shown in FIG. 2.

Figure 2:
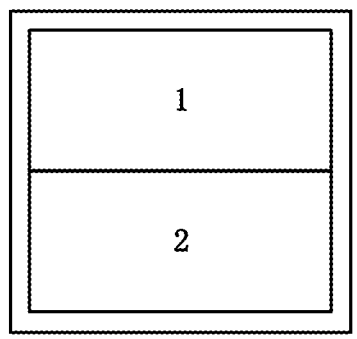
FIG. 2 to FIG. 4 are schematic diagrams of multi-image display according to some embodiments of the present disclosure.

In FIG. 2, the image 1 shows the input video of the 1st channel, and image 2 shows the input video of the 2nd channel.

For another example, in a case where the display of the display apparatus is shown in FIG. 2, if the user wishes that the images of the input video of the 1st channel to the input video of the 4th channel can be displayed simultaneously on the display apparatus, a multi-image display instruction including the video identifiers ID1-ID4 of the input videos of the 1st to 4th channels is sent to the display control apparatus. The display control apparatus multiplexes the input videos of the 1st to $4^{th}$ channels according to the multi-image display instruction to generate a first video, and sends the first video to the display apparatus for multi-image display. The display result is shown in FIG. 3.

Figure 3:
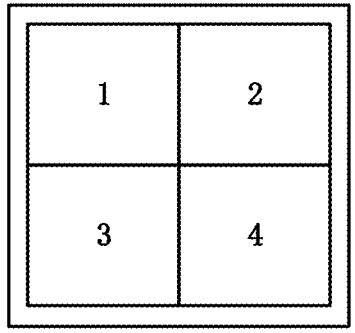

In FIG. 3, image 1 displays the input video of the 1st channel, image 2 displays the input video of the 2nd channel, image 3 displays the input video of the $3^{rd}$ channel, and image 4 displays the input video of the $4^{th}$ channel.

In some embodiments, an area of a image of an input video with high resolution is greater than an area of a image of an input video with low resolution in the first video.

Figure 4:
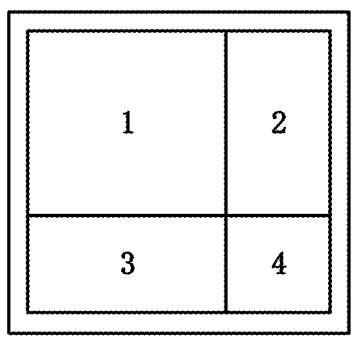

For example, in the input videos of the 1st to $4^{th}$ channels, the input video of the 1st channel has a resolution of 4K, and the input videos of the 2nd to $4^{th}$ channels have a resolution of 2K. Accordingly, the area of the image of the input video of the 1st channel is larger than that of the input videos of the 2nd to $4^{th}$ channels, and the display result is shown in FIG. 4, thereby providing a better viewing experience for the user.

In the display control method provided in the above embodiment of the present disclosure, multi-channel input videos corresponding to multiple video identifiers in a multi-image display instruction are selected to perform multiplexing processing so as to generate an output video for multi-image display, thereby implementing multi-image display switching conveniently and quickly.

Figure 5:
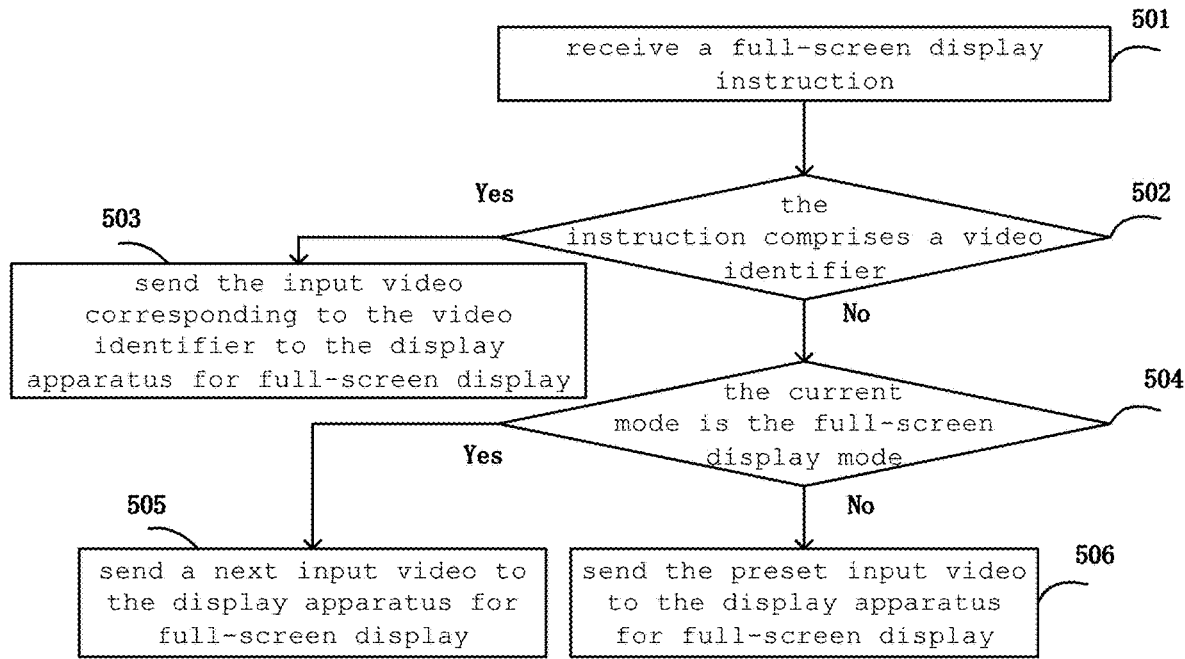
FIG. 5 is a flow diagram of a display control method according to another embodiment of the present disclosure.

FIG. 5 is a flow diagram illustrating a display control method according to another embodiment of the present disclosure. In some embodiments, the display control method is performed by a display control apparatus.

In step 501, it is determined that the received switching instruction is a full-screen display instruction.

In step 502, it is determined whether the full-screen display instruction comprises a video identifier.

If the full-screen display instruction includes a video identifier, step 503 is performed, and if the full-screen display instruction does not include video identifier, step 504 is performed.

In step 503, the input video corresponding to the video identifier included in the full-screen display instruction is sent to the display apparatus for full-screen display.

For example, the input videos of the 1st to $8^{th}$ channels have been accessed to the display control apparatus. If the full-screen display instruction includes a video identifier ID3, it indicates that the user wishes to display the input video of the $3^{rd}$ channel in full screen. In this case, the input video of the $3^{rd}$ channel is sent to the display apparatus for full-screen display.

In step 504, it is detected whether the current display mode is the full-screen display mode.

If the current display mode is the full-screen display mode, go to step 505, and if the current display mode is the multi-image display mode, go to step 506.

In step 505, a next input video of an input video currently displayed in the full screen is sent to the display apparatus for full-screen display.

For example, the received switching instruction is a full-screen display instruction, and the full-screen display instruction does not include a video identifier. In this case, if the input video of the 1st channel is currently displayed in a full-screen mode, the input video of the 2nd channel is sent to the display apparatus in a preset sequence for full-screen display, thereby achieving full-screen display switching.

In step 506, the preset input video is sent to the display apparatus for full-screen display.

For example, the received switching instruction is a full-screen display instruction, but the full-screen display instruction does not include a video identifier. In this case, if the current display mode is a multi-image display mode, the preset input video of the 1st channel is sent to the display apparatus for full-screen display, thereby achieving full-screen display switching.

In some embodiments, if the switching instruction is a preview instruction, all input videos are multiplexed to generate a second video, wherein the resolution of the second video is smaller than the resolution of the first video, and the second video is sent to the display apparatus for previewing.

For example, the input videos of the 1st to $8^{th}$ channels have been accessed to the display control apparatus. And if the received switching instruction is a preview instruction, the input videos of the 1st to $8^{th}$ channels are multiplexed to generate a second video. The resolution of the second video is smaller than a preset threshold, and the second video is sent to a display apparatus for previewing. Because the resolution of the second video is smaller than the preset threshold, the processing load of the display control apparatus can be effectively reduced in the preview mode.

In some embodiments, after receiving a projection instruction sent by the user terminal, a video currently sent to the display apparatus is sent to the user terminal in a wireless manner for displaying.

Figure 6:
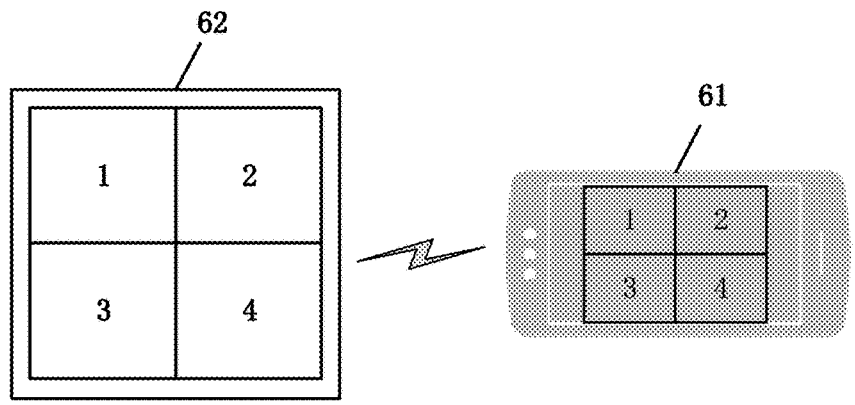
FIG. 6 is a schematic diagram of projection display according to one embodiment of the present disclosure.

For example, as shown in FIG. 6, the user terminal 61 sends a projection instruction to the display control apparatus, and the display control apparatus wirelessly sends a video currently sent to the display apparatus 62 to the user terminal 61 to display the video, so that the content displayed on the display apparatus 62 can be projected onto the user terminal 61.

It should be noted that, the user terminal 61 may adjust the size of the displayed video according to the size of the display screen of the user terminal, so as to improve the viewing experience of the user.

In some embodiments, sliding start position information and sliding end position information is extracted from a sliding operation instruction after receiving the sliding operation instruction sent by the user terminal. The first input video corresponding to the sliding start position information and the second input video corresponding to the sliding end position information are determined in the video currently sent to the display apparatus, and the position of an image of the first input video and the position of an image of the second input video are interchanged.

Figure 7A:
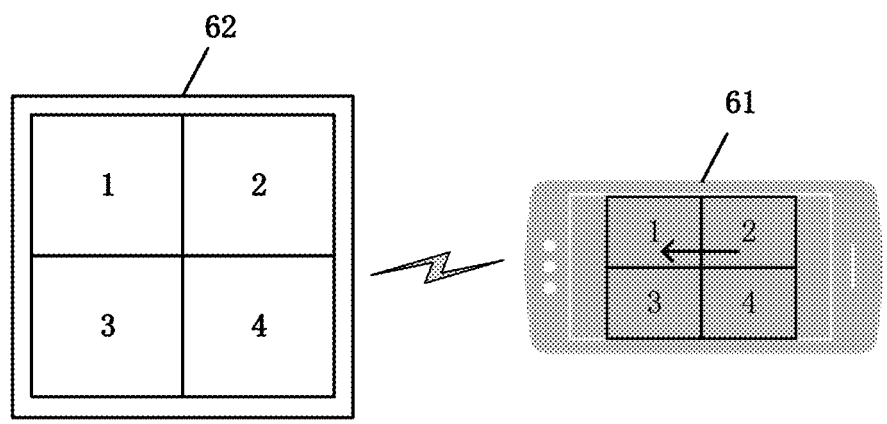
FIG. 7A to FIG. 7C are schematic diagrams of image position interchange according to some embodiments of the present disclosure.

For example, as shown in FIG. 7A, while the user is viewing the input videos 1 to 4 through the user terminal 61, the user wishes to interchange the posotion of the image of the input video 1 and the posotion of the image of the input video 2, then performs a slide operation on the display screen of the user terminal 61, and the sliding start position is within the image of the input video 2, and the sliding end position is within the image of the input video 1. Accordingly, the user terminal 61 sends a sliding operation instruction to the display control apparatus.

Figure 7B:
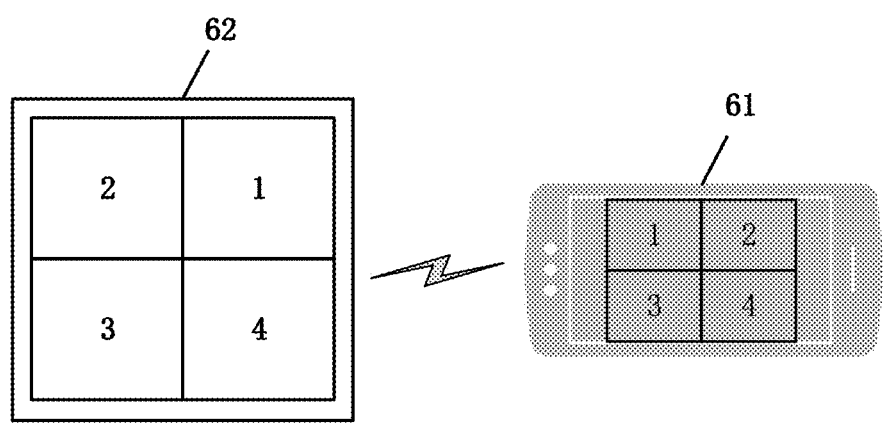

The display control apparatus determines that the first input video corresponds to the sliding start position information and the second input video corresponds to the sliding end position information according to the sliding start position information and the sliding end position information included in the sliding operation instruction, and interchanges the position of the image of the first input video and the position of the image of the second input video. Accordingly, in the video displayed by the display apparatus 62, the position of the image of the first input video and the position of the image of the second input video are interchanged as shown in FIG. 7B.

Figure 7C:
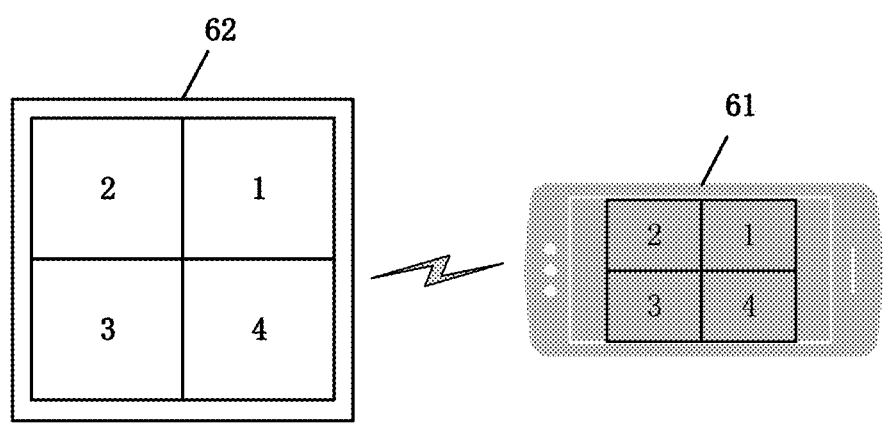

Next, the display control apparatus sends the video sent to the display apparatus to the user terminal 61 in a wireless manner. Therefore the position of the image of the first input video and the position of the image of the second input video are interchanged in the video displayed in the display screen of the user terminal 61 as shown in FIG. 7C. Therefore, the use experience of the user can be further improved.

Figure 8:
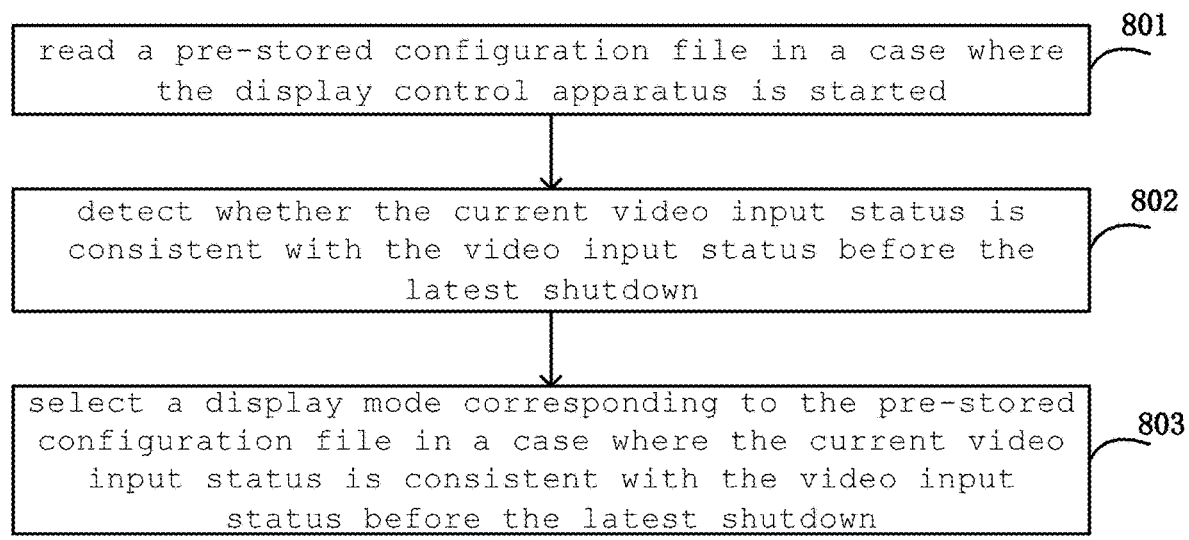
FIG. 8 is a flow diagram of a display control method according to still another embodiment of the present disclosure.

FIG. 8 is a flowchart illustrating a display control method according to another embodiment of the present disclosure. In some embodiments, the display control method is performed by a display control apparatus.

In step 801, a pre-stored configuration file is read in a case where the display control apparatus is started.

The pre-stored configuration file corresponds to a display mode of the display control apparatus before a latest shutdown. That is, the display control apparatus records the current display mode before being shut down.

In step 802, it is detected whether the current video input status is consistent with the video input status before the latest shutdown.

In step 803, a display mode corresponding to the pre-stored configuration file is selected in a case where the current video input status is consistent with the video input status before the latest shutdown.

For example, before the latest shutdown, the input videos of the 1st to $8^{th}$ channels are accessed to the display control apparatus. The display control apparatus multiplexes the input videos of the 1st to $4^{th}$ channels to generate an output video, and sends the output video to the display apparatus for multi-image display. After the display control apparatus is started, if it is detected that the input videos of the 1st to $8^{th}$ channels are accessed to the display control apparatus, the input videos of the 1st to $4^{th}$ channels are still multiplexed to generate an output video, and the output video is sent to the display apparatus for multi-image display.

Figure 9:
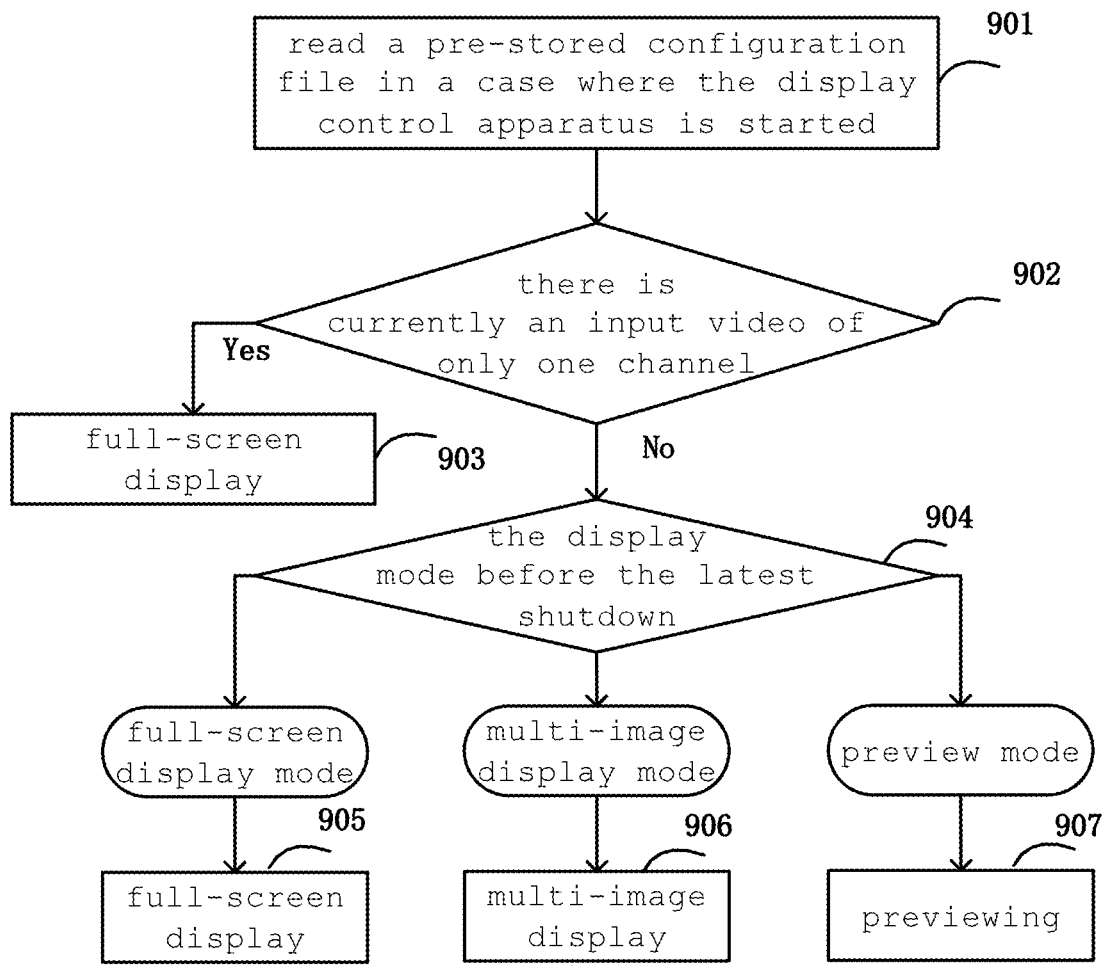
FIG. 9 is a flow diagram of a display control method according to still another embodiment of the present disclosure.

FIG. 9 is a flowchart illustrating a display control method according to another embodiment of the present disclosure. In some embodiments, the display control method is performed by a display control apparatus.

In step 901, a pre-stored configuration file is read in a case where the display control apparatus is started.

The pre-stored configuration file corresponds to a display mode of the display control apparatus before the latest shutdown. That is, the display control apparatus records the current display mode before being shut down.

In step 902, it is determined whether there is currently an input video of only one channel in a case where the current video input status is inconsistent with the video input status before the latest shutdown.

If there is currently an input video of only one channel, step 903 is performed, and if there are currently input videos of a plurality of channels, step 904 is performed.

In step 903, the input video of the only one channel is sent to a display apparatus for full-screen display.

For example, if only the input video of the 1st channel is currently available, the input video of the 1st channel is directly sent to the display apparatus for full-screen display.

At step 904, it is determined the display mode before the latest shutdown.

If the display mode before the latest shutdown is a full-screen display mode, go to step 905; if the display mode before the latest shutdown is a multi-image display mode, go to step 906; if the display mode the latest shutdown is a preview mode, go to step 907.

In step 905, a corresponding input video is selected and sent to the display apparatus for full-screen display.

In some embodiments, it is determined whether there is currently a newly accessed input video.

In a case where there is currently the newly accessed input video of the one channel, the newly accessed input video of the one channel is sent to a display apparatus for full-screen display.

For example, before the latest shutdown, the input videos of the 1st to $3^{rd}$ channels are accessed to the display control apparatus, and a full-screen display mode is adopted. After the starting, if it is detected that the input videos of the 1st to $4^{th}$ channels are accessed to the display control apparatus, the input video of the $4^{th}$ channel is sent to the display apparatus for full-screen display.

In a case where there are currently the newly accessed input videos of the plurality of the channels, the input video from newly accessed input videos of a plurality of channels according to a preset sequence is selected and sent to the display apparatus for full-screen display.

For example, before the latest shutdown, the input videos of the 1st to $3^{rd}$ channels are accessed to the display control apparatus, and a full-screen display mode is adopted. After the starting, if it is detected that the input videos of the 1st to $5^{th}$ channels are connected to the display control apparatus, the input video of the $4^{th}$ channel is sent to the display apparatus for full-screen display according to a preset sequence.

In a case where there is no newly accessed input video, it is detected whether there is an input video quitting access, wherein the input video quitting connection was a connected input video before the latest shutdown.

For example, before the last shutdown, the input videos of the 1st to $4^{th}$ channels are accessed to the display control apparatus. After the starting, the input video of the 1st channel, the input video of the $3^{rd}$ channel and the input video of the $4^{th}$ channel are accessed to the display control apparatus, and the input video of the 2nd channel is an input video quitting access.

In a case where there is the input video quitting access, a next input video of the input video quitting access is sent to a display apparatus for full-screen display according to a preset sequence.

For example, before the last shutdown, the input videos of the 1st to $4^{th}$ channels are accessed to the display control apparatus, and a full-screen display mode is adopted. After the starting, only the input video of the 1st channel, the input video of the $3^{rd}$ channel and the input video of the $4^{th}$ channel are found to be accessed into the display control apparatus, and the input video of the 2nd channel is an input video quitting access, then the input video of the $3^{rd}$ channel is sent to the display apparatus for full-screen display according to a preset sequence.

In step 906, the currently accessed input videos are multiplexed to generate a third video, and the third video is sent to the display apparatus for multi-image display.

In some embodiments, the resolution of the first video is greater than a predetermined threshold, to ensure the viewing effect of the user.

In step 907, the currently connected videos are multiplexed to generate a fourth video, and the resolution of the fourth video is smaller than a preset threshold, and the fourth video is sent to the display apparatus for previewing.

Figure 10:
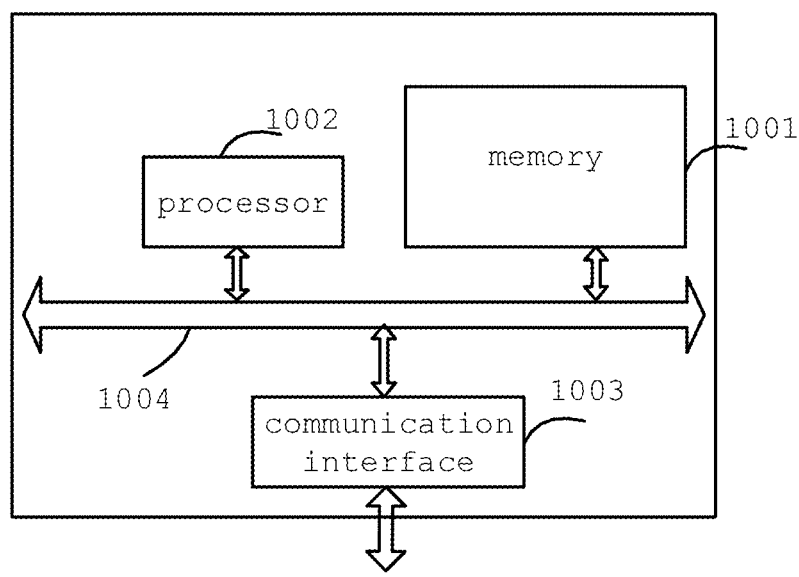
FIG. 10 is a schematic structural diagram of a display control apparatus according to one embodiment of the present disclosure.

FIG. 10 is a schematic structural diagram of a display control apparatus according to an embodiment of the present disclosure. As shown in FIG. 10, the display control apparatus includes a memory 1001 and a processor 1002.

The memory 1001 is used to store instructions. The processor 1002 is coupled to the memory 1001. The processor 1002 is configured to perform the method as described in relation to any of the embodiments of FIGS. 1, 5, 8 and 9 based on instructions stored in the memory.

As shown in FIG. 10, the display control apparatus further includes a communication interface 1003 for performing information interaction with other devices. Meanwhile, the display control apparatus further includes a bus 1004, through which the processor 1002, the communication interface 1003, and the memory 1001 communicate with each other.

The Memory 1001 may include a Random Access Memory (RAM) and a Non-Volatile Memory (NVM), such as at least one disk storage. The memory 31 may also be a memory array. The storage 1001 may also be partitioned into blocks, and the blocks may be combined into virtual volumes according to certain rules.

Further, the processor 1002 may be a central processing unit, or may be an ASIC (Application Specific Integrated Circuit), or one or more Integrated circuits configured to implement embodiments of the present disclosure.

The present disclosure also provides a computer-readable storage medium storing computer instructions which, when executed by the processor, implement the method according to any one of the embodiments in FIGS. 1, 5, 8, and 9.

Figure 11:
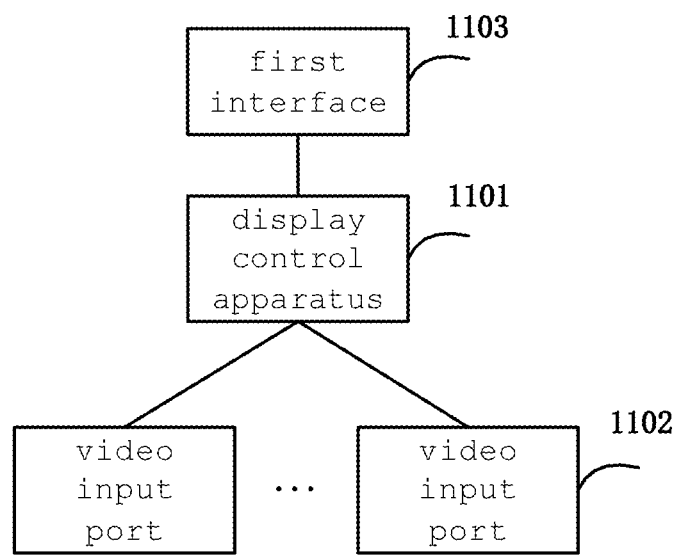
FIG. 11 is a schematic structural diagram of a video processing apparatus according to one embodiment of the present disclosure.

As shown in FIG. 11, the video processing apparatus includes a display control apparatus 1101, a plurality of video input ports 1102, and a first interface 1103. The display control apparatus 1101 is the display control apparatus according to any one of the embodiments of FIG. 10.

The video input port 1102 is configured to send the accessed input video to the display control apparatus 1101.

The first interface 1103 is configured to send a video sent by the display control apparatus 1101 to a display apparatus for display.

Figure 12:
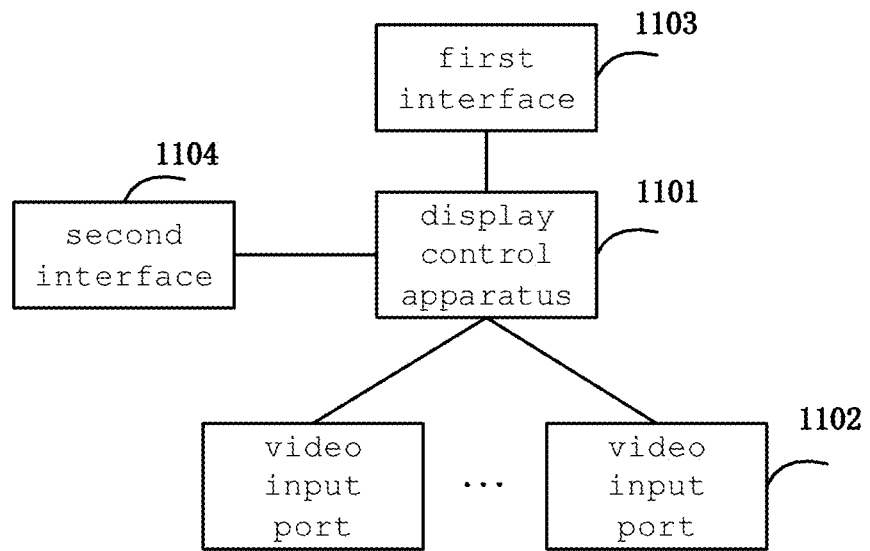
FIG. 12 is a schematic structural diagram of a video processing apparatus according to another embodiment of the present disclosure.

FIG. 12 is a schematic structural diagram of a video processing apparatus according to another embodiment of the present disclosure. The difference between FIG. 12 and FIG. 11 is that in the embodiment shown in FIG. 12, the video processing apparatus further comprises a second interface 1104. The second interface 1104 is configured to wirelessly send the video sent by the display control apparatus 1101 to the user terminal for display.

Figure 13:
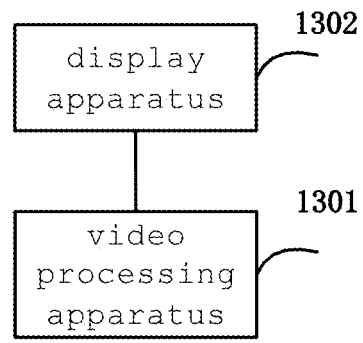
FIG. 13 is a schematic structural diagram of a display system according to one embodiment of the present disclosure.

FIG. 13 is a schematic structural diagram of a display system according to one embodiment of the present disclosure. As shown in FIG. 13, the display system includes a video processing apparatus 1301 and a display apparatus 1302. The video processing apparatus 1301 is the video processing apparatus according to any one of FIG. 11 or FIG. 12.

The display apparatus 1302 is configured to display a video sent by the video processing apparatus 1301.

For example, the display apparatus 1302 may be any product or component having a display function, such as a display, a mobile phone, a tablet computer, a television, a notebook computer, a digital photo frame, and a navigator.

Figure 14:
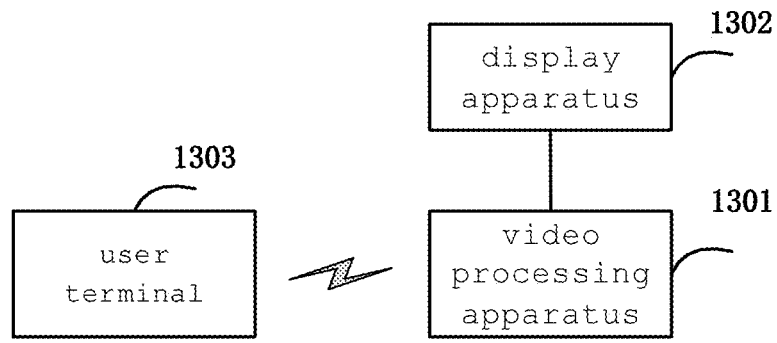
FIG. 14 is a schematic structural diagram of a display system according to another embodiment of the present disclosure.

FIG. 14 is a schematic structural diagram of a display system according to another embodiment of the present disclosure. FIG. 14 is different from FIG. 13 in that, in the embodiment shown in FIG. 14, the display system further includes a user terminal 1303.

The user terminal 1303 is configured to send a projection instruction to the video processing apparatus 1301, receive a video sent by the video processing apparatus 1301 in a wireless manner, and display the video.

In some embodiments, the user terminal 1303 is further configured to send a sliding operation instruction to the video processing apparatus 1301 when the user performs a sliding operation on the video displayed on the user terminal, where the sliding operation instruction includes sliding start position information and sliding end position information. Upon receiving a sliding operation instruction sent from the user terminal 1303, the display control apparatus in the video processing apparatus 1301 extracts the sliding start position information and the sliding end position information from the slide operation instruction. In the video currently sent to the display apparatus 1302, a first input video corresponding to the sliding start position information and a second input video corresponding to the sliding end position information are determined, and the position of the image of the first input video and the position of the image of the second input video are interchanged. Next, the display control apparatus sends the video sent to the display apparatus to the user terminal 61 in a wireless manner. Thus, the position of the image of the first input video and the position of the image of the second input video are interchanged in the video displayed on the display screen of the user terminal 61. Therefore, the use experience of the user can be further improved.

In some embodiments, the apparatus may be implemented as a general purpose processor, a programmable logic controller (PLC), a digital signal processor (DSP), an application specific integrated circuit (ASIC), a field programmable gate array (FPGA) or other programmable logic devices, discrete gates or transistor logics, discrete hardware components, or any suitable combination thereof for performing the functions described in this disclosure.

So far, embodiments of the present disclosure have been described in detail. Some details well known in the art have not been described in order to avoid obscuring the concepts of the present disclosure. Those skilled in the art can now fully appreciate how to implement the technical solution disclosed herein, in view of the foregoing description.

Although some specific embodiments of the present disclosure have been described in detail by way of example, it should be understood by those skilled in the art that the above examples are for illustration only and are not intended to limit the scope of the present disclosure. It will be understood by those skilled in the art that various changes may be made and equivalents may be substituted for elements thereof without departing from the scope and spirit of the present disclosure. The scope of the present disclosure is defined by the appended claims.

What is claimed is:

1. A display control method performed by a display control apparatus, comprising:
   determining whether a received switching instruction is a multi-image display instruction;
   extracting a plurality of video identifiers from the multi-image display instruction in a case where the switching instruction is the multi-image display instruction;
   multiplexing input videos of a plurality of channels corresponding to the plurality of the video identifiers to generate a first video;
   sending the first video to a display apparatus for multi-image display;
   reading a pre-stored configuration file in a case where the display control apparatus is started, wherein the pre-stored configuration file corresponds to a display mode of the display control apparatus before a latest shutdown;
   detecting whether a current video input status is consistent with a video input status before the latest shutdown;
   determining whether there is currently an input video of only one channel in a case where the current video input status is inconsistent with the video input status before the latest shutdown;
   determining whether a display mode before the latest shutdown is a full-screen display mode in a case where there are currently input videos of a plurality of channels;
   multiplexing the current accessed videos to generate a second video in a case where the display mode before the latest shutdown is a preview mode, wherein resolution of the second video is smaller than a preset threshold; and
   sending the second video to a display apparatus for previewing.

2. The display control method according to claim 1, further comprising
   selecting a display mode corresponding to the pre-stored configuration file in a case where the current video input status is consistent with the video input status before the latest shutdown.

3. The display control method according to claim 2, further comprising
   sending the input video of the only one channel to a display apparatus for full-screen display in a case where there is currently the input video of the only one channel.

4. The display control method according to claim 3, further comprising:
   determining whether there is currently a newly accessed input video in a case where the display mode before the latest shutdown is the full-screen display mode;
   sending a newly accessed input video of one channel to a display apparatus for full-screen display in a case where there is currently the newly accessed input video of the one channel; and
   selecting an input video from newly accessed input videos of a plurality of channels according to a preset sequence in a case where there are currently the newly accessed input videos of the plurality of the channels and sending selected input video to the display apparatus for full-screen display.

5. The display control method according to claim 4, further comprising:
   detecting whether there is an input video quitting access in a case where there is no newly accessed input video, wherein the input video quitting access is an input video that was accessed before the latest shutdown; and
   sending a next input video of the input video quitting access to a display apparatus for full-screen display according to a preset sequence in a case where there is the input video quitting access.

6. The display control method according to claim 4, further comprising:

multiplexing the currently accessed input videos to generate a third video in a case where the display mode before the latest shutdown is a multi-screen display mode; and sending the third video to a display apparatus for multi-screen display, wherein resolution of the third video is greater than a preset threshold.

* * * * *